April 2, 1946.  J. A. LENO ET AL  2,397,551
ELECTRICAL CONDENSER HOUSING
Filed May 16, 1942
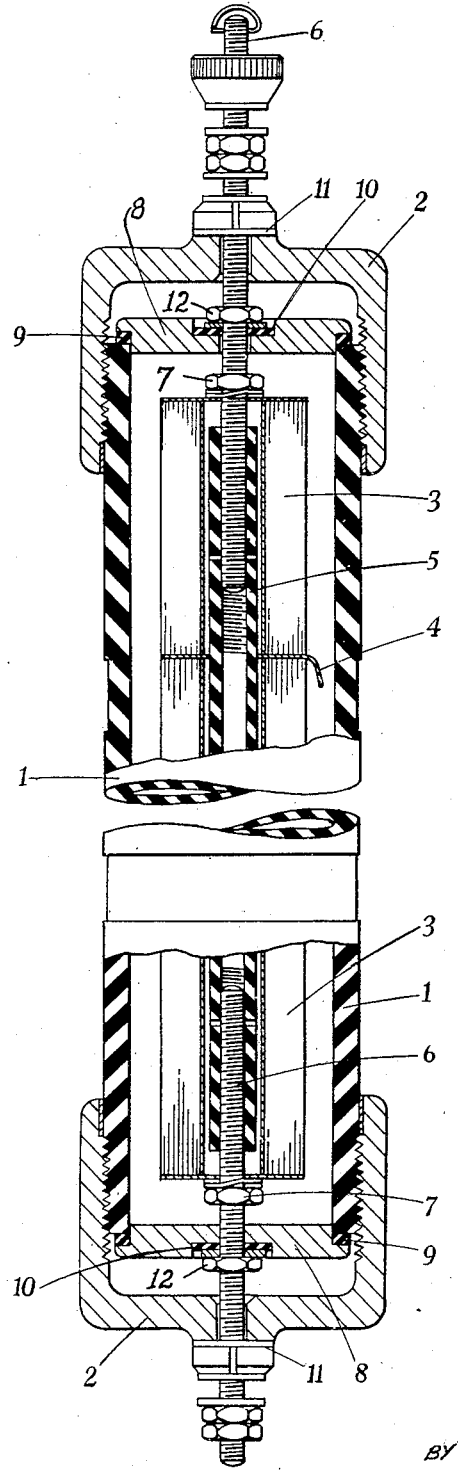
INVENTORS
J. A. Leno
W. J. Shay
BY
R. P. Morris
ATTORNEY Patented Apr. 2, 1946

2,397,551

UNITED STATES PATENT OFFICE 2,397,551

ELECTRICAL CONDENSER HOUSING

John Albert Leno and William John Stray, London W. C. 2, England, assignors to International Standard Electric Corporation, New York, N. Y.

Application May 16, 1942, Serial No. 443,292
In Great Britain September 15, 1941

3 Claims. (Cl. 174—31)

This invention relates to the manufacture of electrical condensers; more especially, though not exclusively, to those for use at high voltage, working, for example, at a pressure of 30 kv. direct current.

The invention consists in an electrical condenser comprising a plurality of preformed rolled condenser units mounted end-to-end within an oil—or like—filled tubular casing of insulating material having each end sealed both by an external cap and by and endwise abutting disc.

The accompanying drawing shows by means of a longitudinal section a high-voltage condenser made in accordance with the invention.

This condenser is of tubular form comprising outer casing 1 which is made from suitable insulating material such as phenolic resin impregnated paper, ebonite, etc., and is screwed at both ends to accommodate suitable metal end caps 2. Inside the tube are housed the required number of preformed rolled condenser units 3 which are in series formation, each adjacent unit making end contact with the next by virtue of the extended metal foil, and as a secondary precaution are provided with metal tapes 4 which are joined in close contact by soldering or such similar means.

These units are held on a centre tube 5 of insulating material similar to that used for the outer casing 1 by a threaded stem 6 and nuts 7. The units, while thus assembled, are impregnated with oil or some other suitable impregnant, such as supertension cable oil.

The assembly of condenser units is next inserted into the outer tube 1, one end of the tube being first sealed by a metal disc 8 held by a nut 12 threaded on the stem 6 and one metal end cap 2 screwed into place; after filling the cavity surrounding the units with oil or some suitable medium, the second metal disc 8 is secured in place by the second nut 12 and the remaining end cap 2 fitted. The importance of this arrangement lies in the fact that rubber washers 9 and 10 provide an efficient seal against oil leakage. A further rubber washer 11 is fitted at the junction where the terminal stem 6 passes through the end cap 2. The end caps, while serving as terminals, provide a second seal as these are coated internally at the threaded portion with a suitable cement such as a synthetic resin cement.

The threaded stems 6 pass through the metal end caps and serve as suitable means of termination for wires.

What is claimed is:

1. An oil-filled condenser housing comprising a condenser support, a wall around said support, a stem protruding from each end of said support, a rigid disc mounted on each stem and covering each end wall, means secured to said stem for holding said discs in position on said stems, a flexible washer between each disc and an adjacent portion of the wall forming an oil proof seal, and an external cap covering each disc, said caps being mounted on the respective stems and fastened to said wall with a seal to the wall and to the stem.

2. An oil-filled condenser housing as set forth in claim 1 including a flexible washer between each said cap and its respective stem.

3. An oil-filled condenser housing as set forth in claim 1 including a flexible washer between each said disc and its respective stem.

JOHN ALBERT LENO.
WILLIAM JOHN STRAY.